United States Patent
Smith et al.

(10) Patent No.: US 6,865,827 B2
(45) Date of Patent: Mar. 15, 2005

(54) UTILITY DEVICE HAVING AN IMPROVED ROTATABLE DRIVE MECHANISM

(75) Inventors: David R. Smith, Fort Jennings, OH (US); Mark A. Recker, Ottawa, OH (US)

(73) Assignee: Unverferth Manufacturing Co., Inc., Kalida, OH (US)

( * ) Notice: Subject to any disclaimer, the term of this patent is extended or adjusted under 35 U.S.C. 154(b) by 63 days.

(21) Appl. No.: 10/385,498

(22) Filed: Mar. 12, 2003

(65) Prior Publication Data

US 2003/0201107 A1 Oct. 30, 2003

Related U.S. Application Data

(60) Provisional application No. 60/364,058, filed on Mar. 15, 2002.

(51) Int. Cl.$^7$ ................................................. A01B 33/00
(52) U.S. Cl. .............................. 37/386; 37/189; 37/466; 172/21; 172/122; 172/123; 172/173; 172/537; 172/554
(58) Field of Search ........................... 37/462–466, 189, 37/190, 337, 386; 172/21, 22, 122, 123, 170, 172, 173, 518, 537, 554

(56) References Cited

U.S. PATENT DOCUMENTS

| | | | | |
|---|---|---|---|---|
| 4,340,320 A | * | 7/1982 | Moss | .......................... 404/122 |
| 4,883,134 A | * | 11/1989 | Bollinger et al. | .............. 175/96 |
| 5,807,199 A | * | 9/1998 | Keller | ........................... 475/72 |
| 6,249,993 B1 | | 6/2001 | Armstrong et al. | |

OTHER PUBLICATIONS

McMillen, M. "Attached and Versatile." *US Industry Today*, 4 pp, date unknown.

"Trencher." *Lahman Little Dipper*, 1p, date unknown.

"Trencher attachments." *IR Bobcat*, 2 pp., date unknown.

"Preseeder Landscape Tillers." *Landscape Tillers*, 6 pp, date unknown.

\* cited by examiner

*Primary Examiner*—Christopher J. Novosad
(74) *Attorney, Agent, or Firm*—Rothwell, Figg, Ernst & Manbeck, PC

(57) ABSTRACT

A utility vehicle or other device for excavating soil or the like includes a utility mechanism, such as, e.g., a trencher, an auger or the like, with a motor-driven utility drum. In preferred embodiments, the motor is contained substantially entirely inside the drum. Preferably, the drive shaft is operatively connected to the drum to rotate the drum at a connection location that is displaced inward from ends of the drum. In some embodiments, the drive shaft is also preferably operatively connected to a second utility mechanism, such as, e.g., a trencher chain. In some embodiments, a planetary transmission is also located inside the drum.

30 Claims, 13 Drawing Sheets

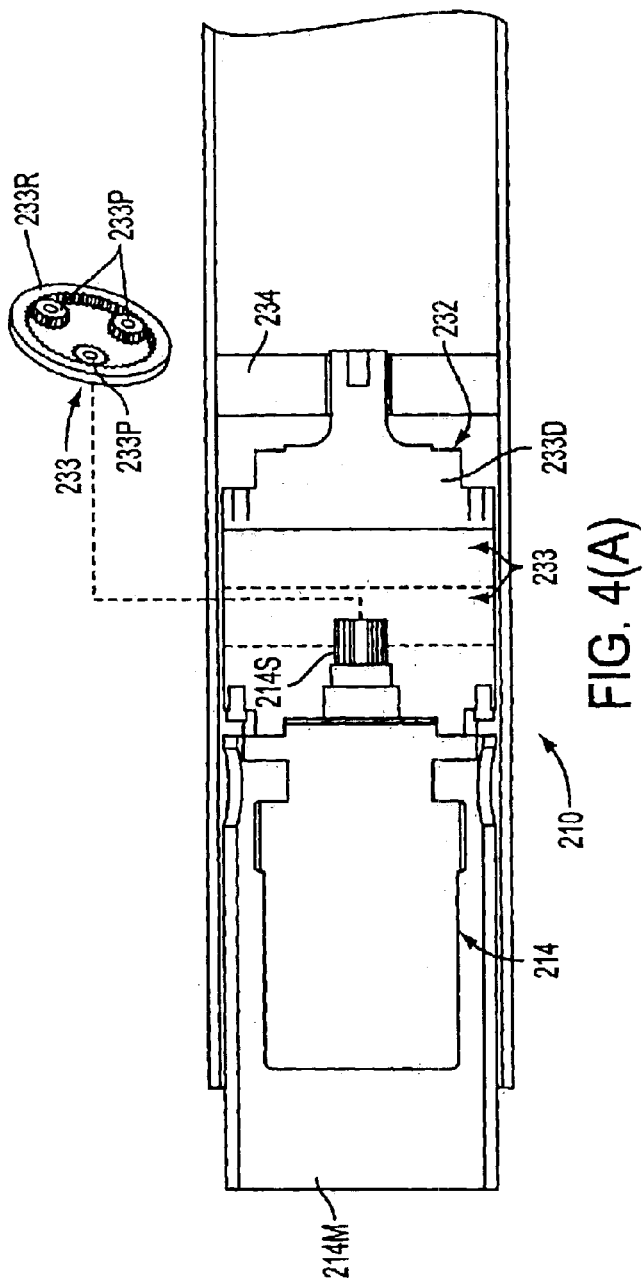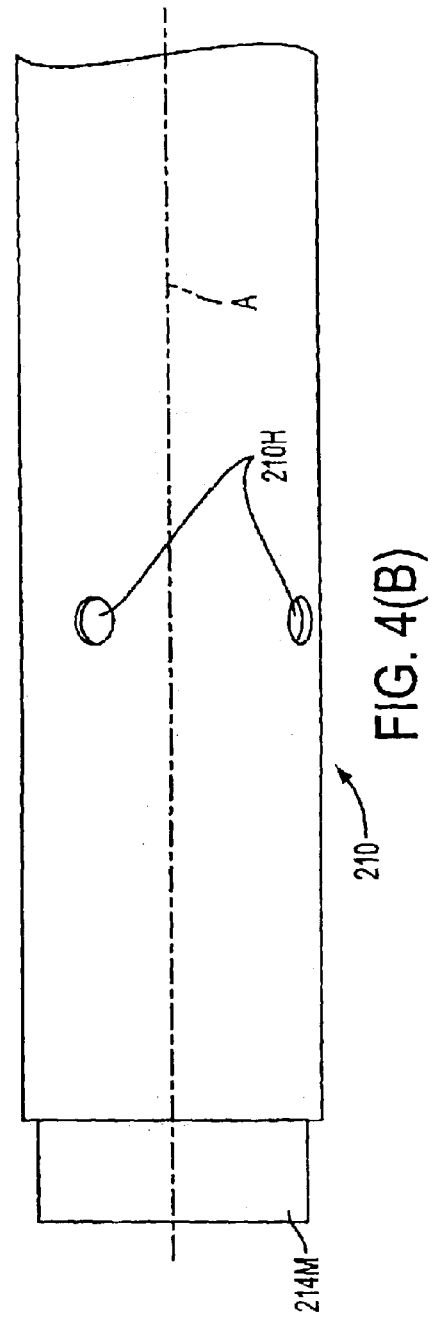

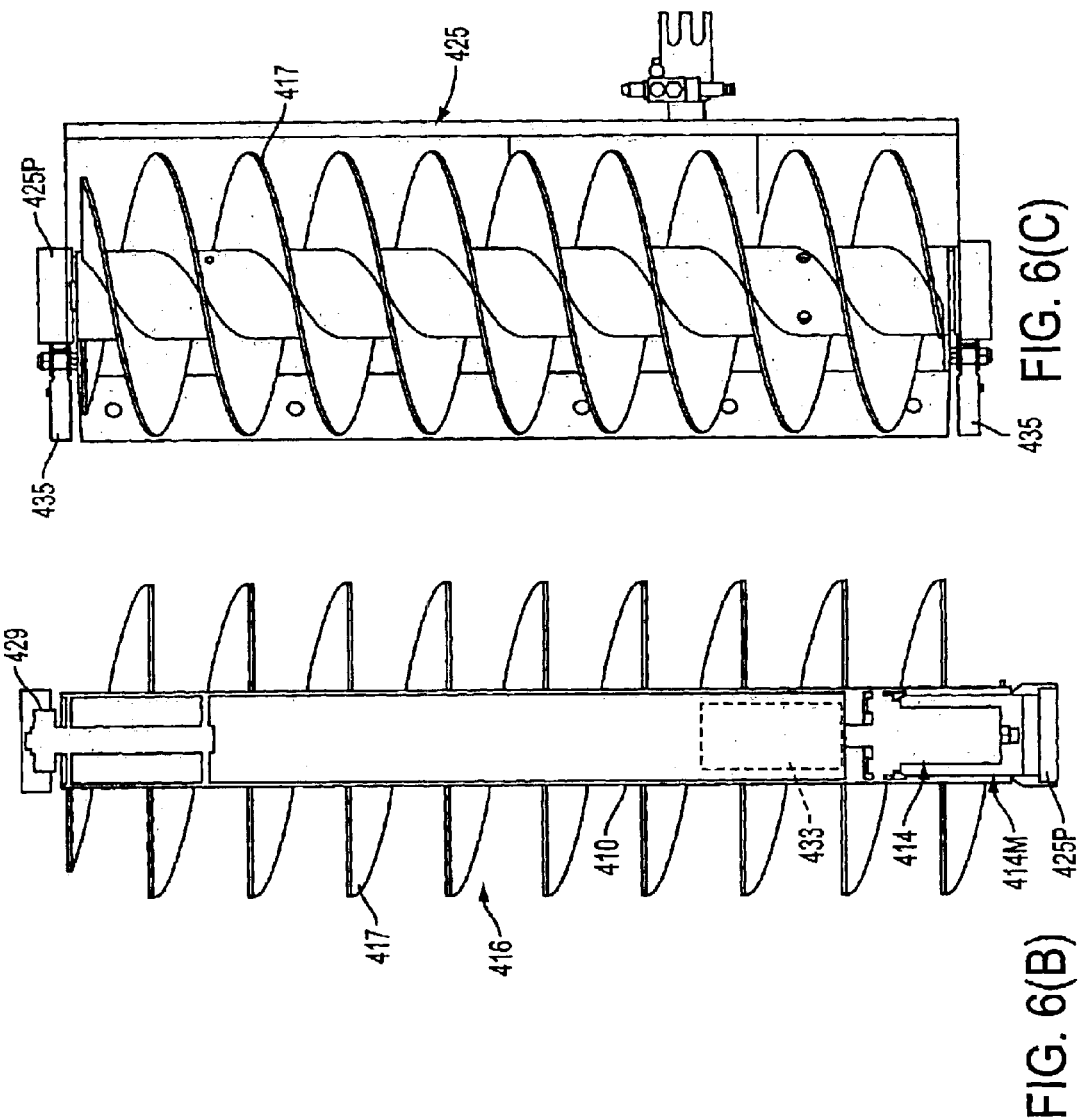

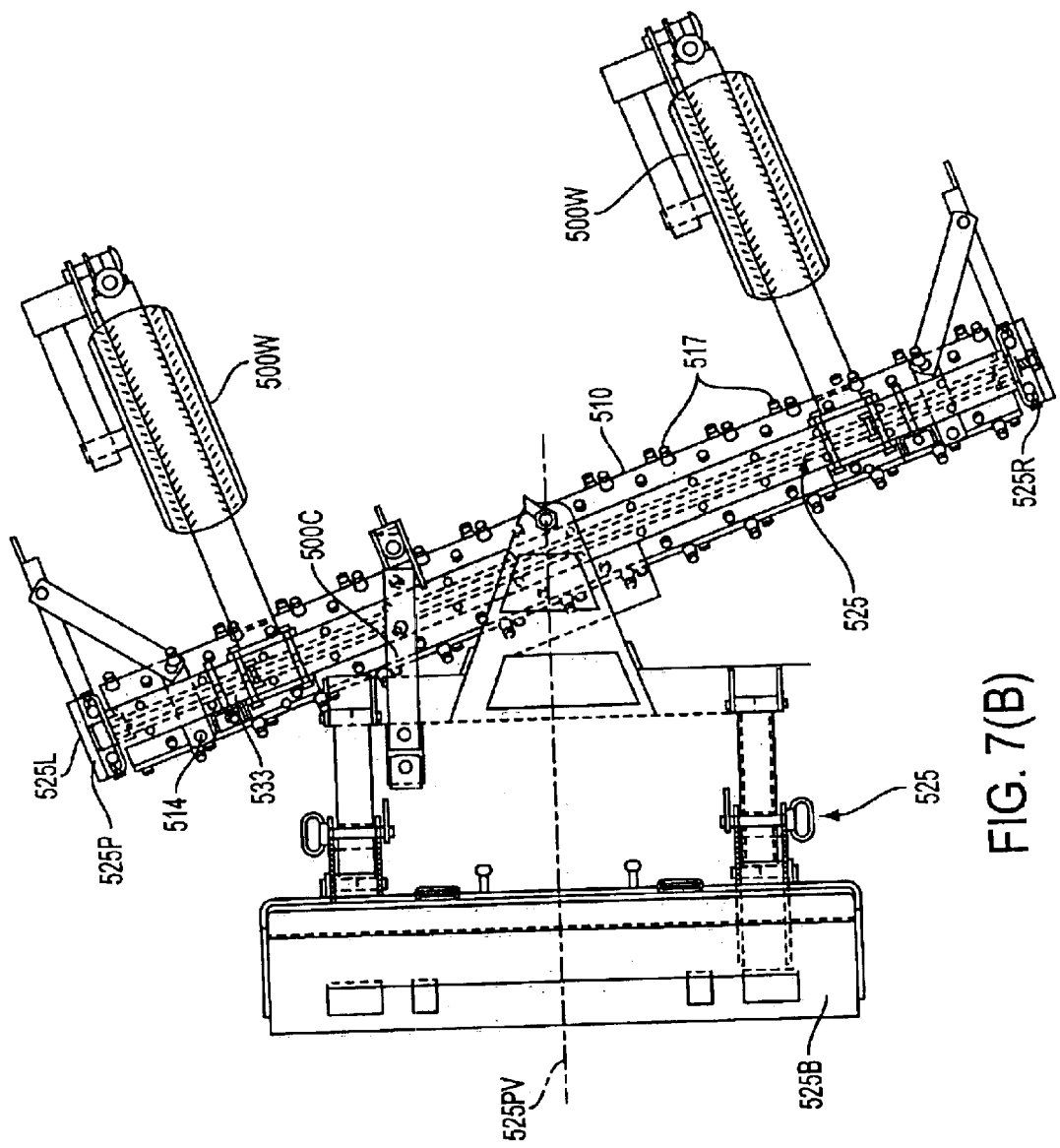

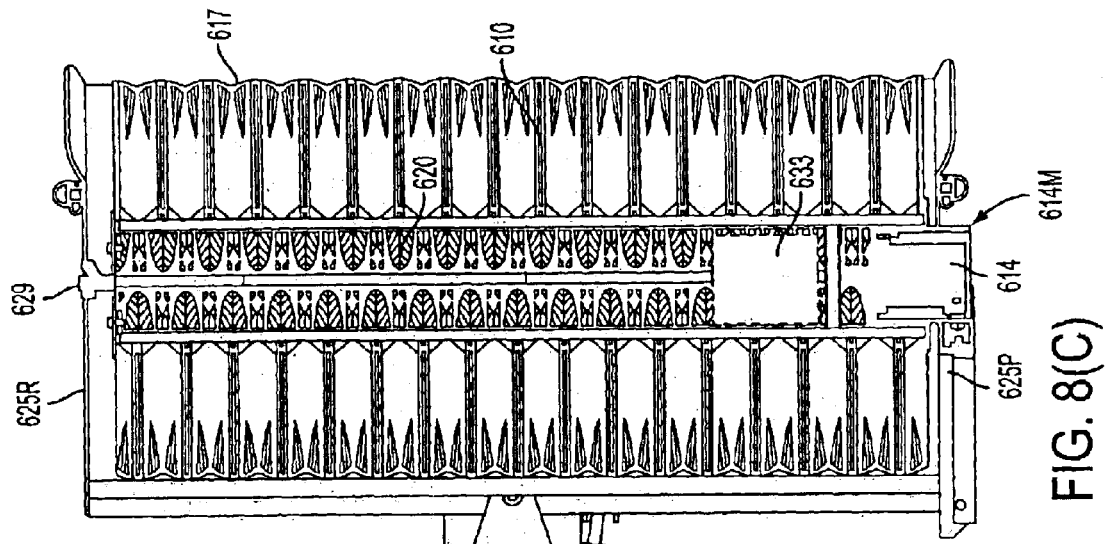
FIG. 8(C)
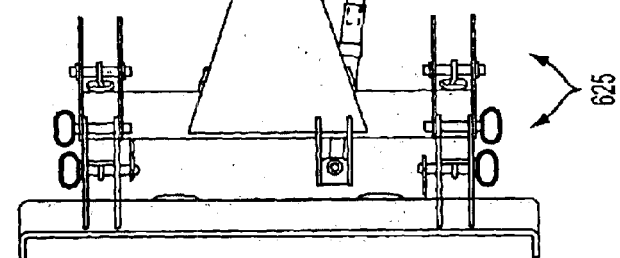
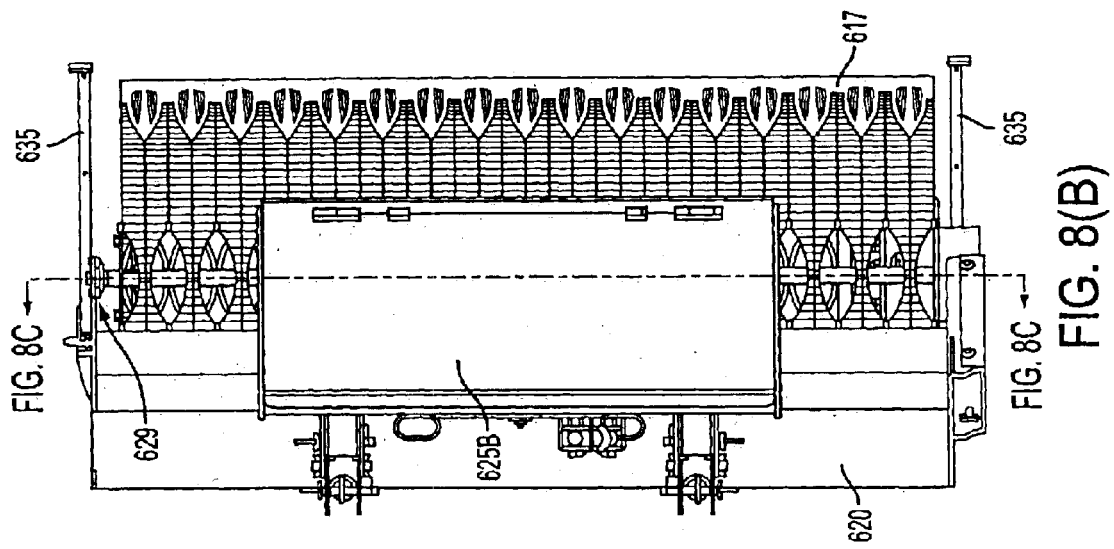
FIG. 8(B)

UTILITY DEVICE HAVING AN IMPROVED ROTATABLE DRIVE MECHANISM

The present application claims priority to Provisional Patent Application Ser. No. 60/364,058, filed on Mar. 15, 2002, the entire disclosure of which is incorporated herein by reference.

BACKGROUND

1. Field of the Invention

The present invention relates generally to, among other things, utility devices, such as, for example, utility vehicles, having utility mechanisms, such as, for example, trenchers and/or the like with rotated drive mechanisms.

2. Discussion of the Background

There are a variety of known utility vehicles having utility mechanisms with rotated drive mechanisms. In many instances, utility vehicles are often used for construction and/or other utilitarian purposes, such as, e.g., for lifting, pushing, scraping, digging, plowing and/or various other purposes. In many instances, the vehicles include a) a main body having at least one seat for a vehicle operator (such as, for example, a seat located within a protective cab), b) wheels and/or other supports mounted on the body portion for supporting the same, and c) a utility mechanism mounted to the vehicle (such as, e.g., via a utility boom). In some illustrative cases, the utility mechanism(s) can include, e.g., one or more of the following: a) an auger; b) a backhoe; c) a dozer blade; e) a bucket; f) a fork (e.g., for pallets, manure or the like); g) a grinder; h) a rake; i) shears; j) a roller; k) spike (e.g., for bails of hay or the like); l) a jig boom; m) a broom; n) a scraper; o) a tree spade; p) a plow; q) a mower; r) a trencher; s) a four-in-one bucket; and/or various other utility mechanisms. In some instances, the vehicle is adapted such that various utility mechanisms can be replaced, interchanged, upgraded and/or the like. In this manner, in some instances, a basic vehicle can be adapted or configured to perform specific tasks (such as, e.g., by attaching a new utility mechanism to the vehicle).

Because these vehicles are often used for work related purposes, improvements that can reduce manufacturing costs, increase longevity and/or durability, increase performance and/or that can provide other advances can be advantageous. Nevertheless, existing devices have a variety of limitations.

A number of illustrative background devices include, for example: a) the BRADCO trencher (by U.S. INDUSTRIES); the BOBCAT trencher (LT304); the LAHMAN LITTLE DIPPER trencher (by LAHMAN MANUFACTURING COMPANY, INC.); and the CATERPILLAR trencher depicted in U.S. Pat. No. 6,249,993. These and other background trenchers have a variety of limitations. As merely some examples, these and other background devices often have one or more of the following disadvantages: require chain drives and/or sealed oil bath transmission cases; require a large width for a protruding motor, transmission and/or the like; do not effectively provide spoil augers on two sides of a trencher chain and/or the like; are expensive to manufacture; have reduced longevity and/or durability; have less than optimal performance; and/or have various other disadvantages.

There remains a need for, among other things, utility vehicles having utility mechanisms with improved rotated drive mechanisms.

SUMMARY OF THE PREFERRED EMBODIMENTS

The preferred embodiments of the present invention can significantly improve upon existing systems and methods. In some preferred embodiments, a utility vehicle is provided that has an improved rotated drive mechanism.

In some embodiments, a utility vehicle or other device for excavating soil or the like includes a utility mechanism, such as, e.g., a trencher, an auger or the like, with a motor-driven utility drum. In preferred embodiments, the motor is contained substantially entirely inside the drum. Preferably, the drive shaft is operatively connected to the drum to rotate the drum at a connection location that is displaced inward from ends of the drum. In some embodiments, the drive shaft is also preferably operatively connected to a second utility mechanism, such as, e.g., a trencher chain. In some embodiments, a planetary transmission is also located inside the drum.

In some embodiments, a soil-engaging utility device having a utility mechanism with a motor-driven utility drum is provided that includes: a support to support the device on a vehicle; a utility mechanism including a rotatable drum, the drum including at least one soil-engaging member on a periphery of the drum, the drum being positionable generally horizontally and generally transverse to the vehicle; a motor contained substantially entirely inside the drum, the motor having a drive shaft extending inwards into the drum; planetary gear set inside the drum and operatively connected to the drive shaft to increase torque between the drive shaft and the drum, the planetary gear set converting a higher revolution-per-minute rotation to a lower revolution-per-minute rotation; and an output of the planetary gear set being operatively connected to the drum at a connection location that is displaced inward from ends of the drum to reduce torsion on the drum.

In some embodiments, a method for enhancing torsion properties of a soil utility mechanism having a motor-driven utility drum is provided that includes: providing a soil utility mechanism including a rotatable drum, the drum including at least one soil-engagement member extending therefrom around a periphery of the drum, the drum being positionable generally horizontally and generally transverse to the vehicle, and a motor contained substantially entirely inside the drum, the motor having a drive shaft extending inwards into the drum; increasing torque from the drive shaft via a planetary transmission located inside of the drum; reducing torsion on the drum by operatively connecting an output of the planetary gear transmission to the drum at a location that is displaced substantially inward from opposite ends of the drum to reduce torsion on the drum; and engaging soil with the soil-engagement members so as to create torque on the drum.

In some embodiments, a soil-engaging utility device having a utility mechanism with a motor-driven utility drum is provided that includes: a support to support the device on a vehicle; the utility mechanism including a rotatable drum, the drum including at least one soil-engaging member extending around a periphery of the drum, the drum being positionable generally horizontally and generally transverse to the vehicle; a motor contained substantially entirely inside the drum, the motor having a drive shaft extending inwards into the drum; the drive shaft being operatively connected to the drum at a connection location that is displaced inward from ends of the drum to reduce torsion on the drum; the drive shaft also being operatively connected to a second utility mechanism so as to effect movement of the second utility mechanism.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The accompanying figures, in which similar reference numerals show similar elements, are provided by way of example, without limiting the broad scope of the invention or various other embodiments, wherein:

FIG. 4(A) is a cross-sectional view of a drive drum and internal drive components in some embodiments employing a planetary transmission;

FIG. 4(B) is a side view of the drive drum shown in FIG. 4(A);

FIG. 6(B) is a cross-sectional side view of the auger assembly shown in FIG. 6(A);

FIG. 6(C) is a front view of the auger assembly shown in FIG. 6(A);

FIG. 7(B) is a top view of the rake assembly shown in FIG. 7(A);

FIG. 8(B) is a rear view of the broom assembly shown in FIG. 8(A); and

FIG. 8(C) is a cross-sectional top view of the broom assembly shown in FIG. 8(A).

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

The preferred embodiments of the invention include novel rotatable drive mechanisms implemented within a utility vehicle. In various embodiments, the novel drive mechanisms can be implemented within various utility vehicles, such as various utility vehicles having utility mechanisms with rotatable drive mechanisms, such as for a trencher and/or the like. The following section describes some non-limiting examples of illustrative vehicles in which some embodiments of the present invention can be implemented. It should be appreciated that these examples are provided by way of illustration only.

Illustrative Vehicle Environment:

The preferred embodiments of the invention can be implemented within a variety of vehicles, such as, for example, within vehicles having a raised and/or lowered utility booms, such as, e.g., various skid steer loaders. While preferred embodiments described herein show skid steer loaders, it should be appreciated that the various embodiments may be employed within any appropriate vehicle type. While some illustrative vehicle structures are described which include a trencher utility accessory connected to the boom, it should be appreciated that the various embodiments may employ any other appropriate utility mechanism having a rotated drive mechanism, such as, for example, some of the utility mechanisms discussed herein and/or otherwise available in the art.

Figure 1:
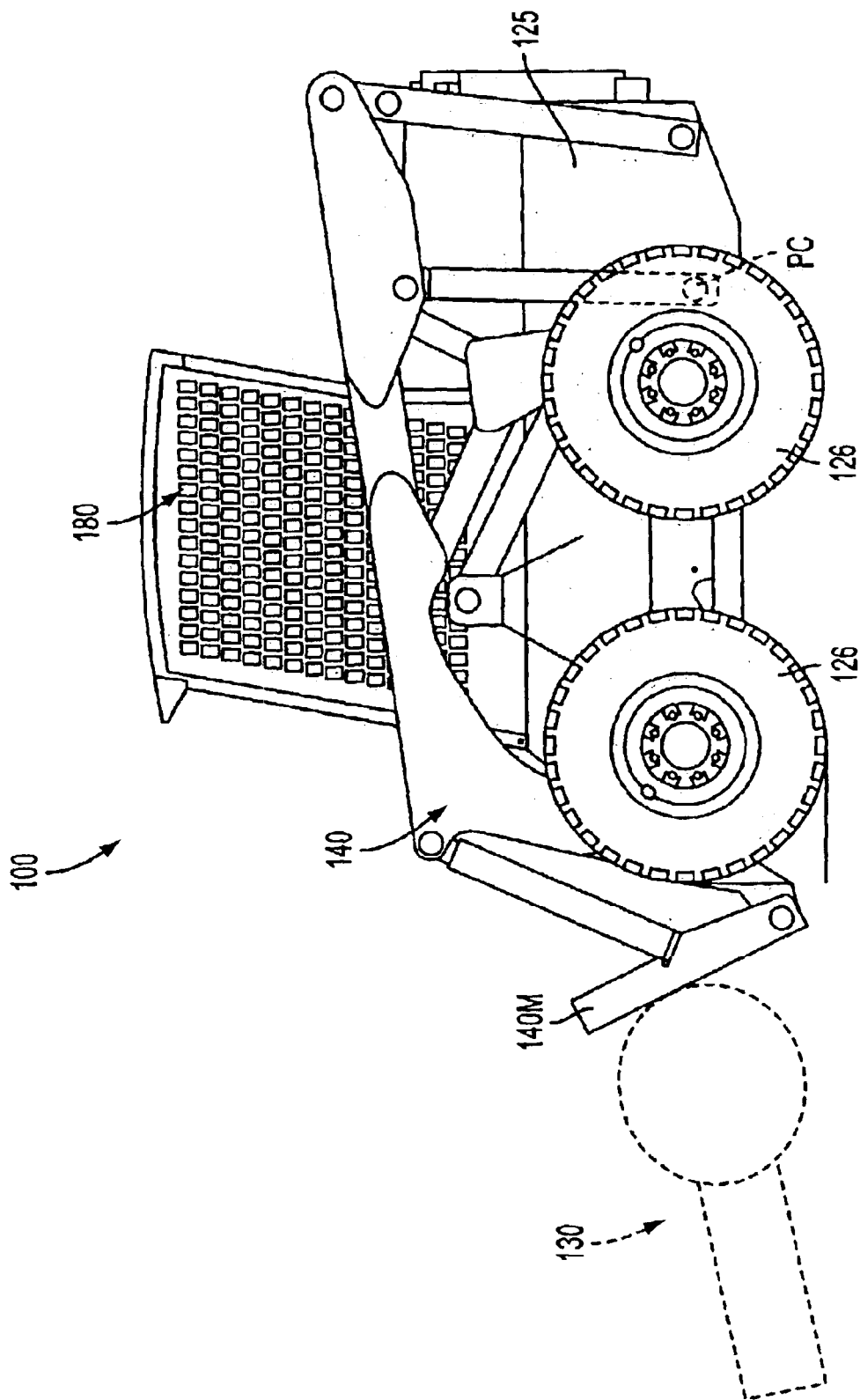
FIG. 1 is a side view of an illustrative utility vehicle within which some illustrative embodiments of the invention may be employed with a boom in a lowered position.
Figure 2:
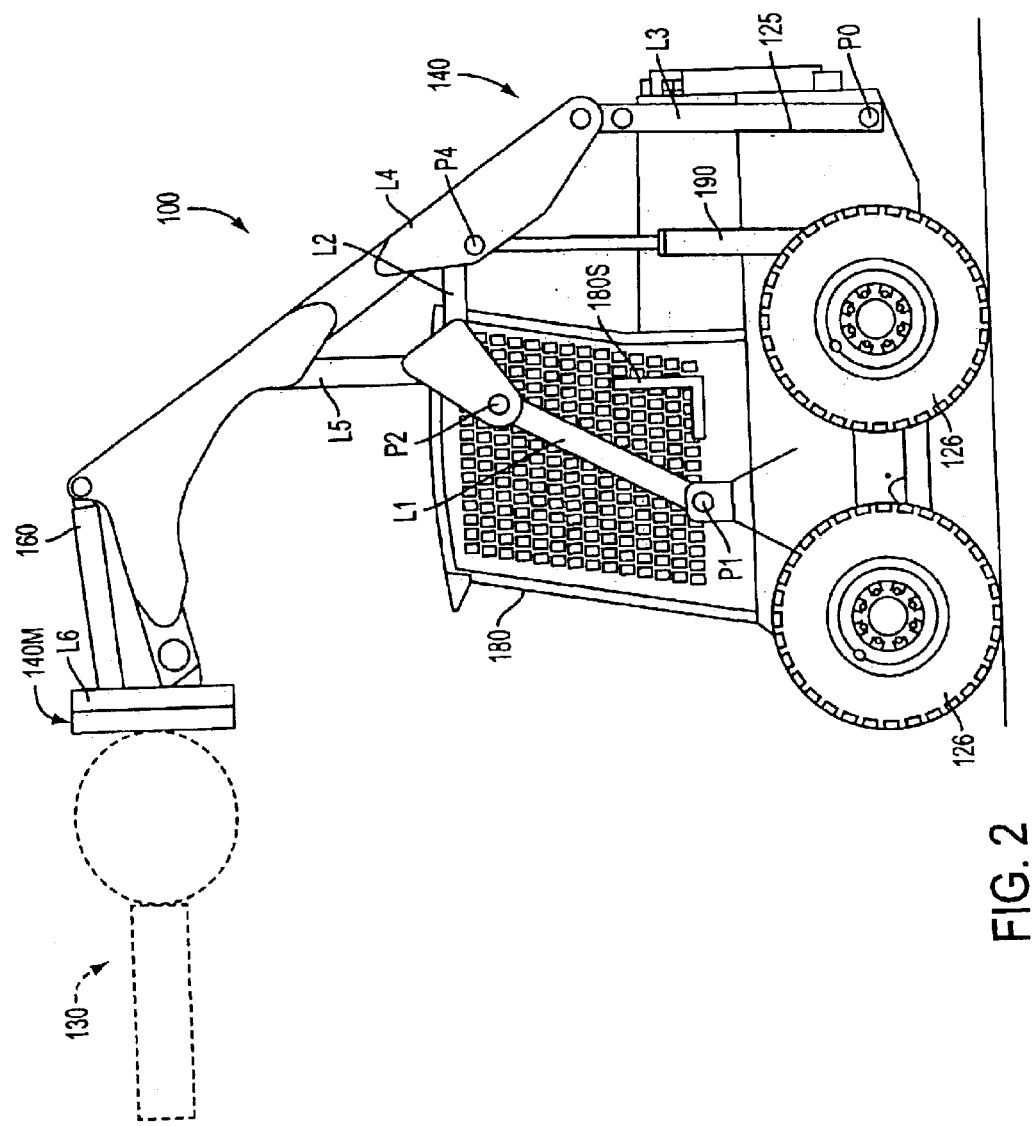
FIG. 2 is a side view of the vehicle shown in FIG. 1 with a boom in a raised position.

FIGS. 1–2 show illustrative vehicles in which some preferred embodiments of the invention can be implemented. In this regard, FIG. 1 shows an illustrative embodiment of a skid steer vehicle with a boom in a lowered position.

As illustrated, the vehicle 100 preferably includes a main body 125. In the illustrated embodiment, the main body 125 is movably supported via a plurality of wheels 126. While the illustrated embodiments include four wheels, other embodiments can include any other number of wheels and/or can include other support mechanisms such as belts, stabilizers and/or the like. As mentioned above, while the wheels 126 can provide skid steering, other embodiments could include or use other forms of steering.

In some preferred embodiments, the vehicle 100 includes an operator cab 180 having at least one seat 180S, such as, e.g., shown in FIG. 2, fixedly mounted therein. In preferred embodiments, the cab 180 includes left and/or right protective side walls (such as, e.g., including a lattice or grid-work of metal bars as shown) and/or a protective cover. Preferably, the cab 180 is mounted via a mechanism that enables the cab to move towards a front of the vehicle for maintenance purposes. In that regard, the cab 180 is preferably mounted so as to pivot towards a front of the vehicle.

In some preferred embodiments, a boom 140 is provided that can be located in lowered position (such as, e.g., shown in FIG. 1) and/or in a raised position (such as, e.g., shown in FIG. 2). In some preferred embodiments, a boom linkage is provided that is in a retracted state when the boom is in the lowered position and in an expanded state when the boom is in the raised position.

In some illustrative and non-limiting embodiments, the boom includes respective boom assemblies on left and right sides of the vehicle 100, respectively. As shown in FIGS. 1 and 2, the boom preferably includes a mount 140M for mounting a utility mechanism 130, such as, e.g., a trencher, an auger and/or any other utility mechanism known in the art.

In some preferred embodiments, the boom can include links L1–L6 substantially as illustrated. In that regard, the link L1 is preferably pivotally attached to the body 125 at a pivot P1 and is pivotally attached to a bracket LB at a pivot P2. In some embodiments, the link L3 can be pivotally attached to the body 125, such as, e.g., at a pivot P0. In some embodiments, the link L3 can be fixedly attached to the body 125 so as to extend generally upright therefrom. In some embodiments, the link L4 can be pivotally attached to the link L3 at a location above the top of the body 125, such as, e.g., as shown. Preferably, the link L4 is an elongated member that extends from the link L3 to a top of the boom. In the illustrated embodiment, the link L4 is generally L-shaped and includes a cylinder 160 connected between a pivot on the link L4 and a pivot on the link L6. In some embodiments, a utility mechanism 130 can be connected to a mount 140M supported on the link L6 and pivotally attached to the link L4.

In some embodiments, the boom can be raised and/or lowered via at least one cylinder 190. In some preferred embodiments, the cylinder 190 is a hydraulically powered cylinder with an extendable cylinder rod. A base end of the cylinder is preferably pivotally attached to the body 125, while a distal end of the cylinder rod is preferably pivotally attached to the link L4 at pivot P4. As shown in phantom lines in FIG. 1, the boom cylinder 190 is also preferably connected to the vehicle 100 at the pivot PC.

In some illustrative preferred embodiments, the structure of the vehicle can be sized and configured with dimensions substantially as shown in FIGS. 1–2, with such figures being substantially proportional and to scale in some illustrative and non-limiting embodiments of the invention.

In some preferred embodiments, the vehicle can include a plurality of user operator control elements that can control operation of, for example, a vehicle engine throttle, an extendable boom, an auxiliary device, a utility mechanism (such as a trencher or the like) and/or other vehicle functions. These control elements can include, e.g., hand-operated controls (such as lever arms or the like) and/or foot-operated controls (such as, e.g., foot pedals or the like). In some preferred embodiments at least some of the control elements include similar attachment mechanisms that can be reattached to different function drive elements (such as, e.g., cables or the like) as needed. In some illustrative embodiments, some vehicle functions can include, for example, one or more, preferably all, of the following functions F1–F4:

F1: Lifting and/or lowering of a boom
(such as, e.g., by operating hydraulic boom cylinders as shown);
F2: Rotation of a trencher or the like utility mechanism
(such as, e.g., via a hydraulic motor);
F3: Increase and/or decrease of an engine throttle (such as, e.g., by controlling a throttle valve to increase fuel introduction rate and/or to decrease fuel introduction rate); and
F4: Control of auxiliary devices, such as auxiliary attachments, other utility mechanisms and/or other components (such as, e.g., depending on circumstances and/or needs).

It should be appreciated that various other embodiments can involve one or more of the above functions and/or various other functions as would be known in the art and/or as would depend on the circumstances at hand.

Figure 3C:
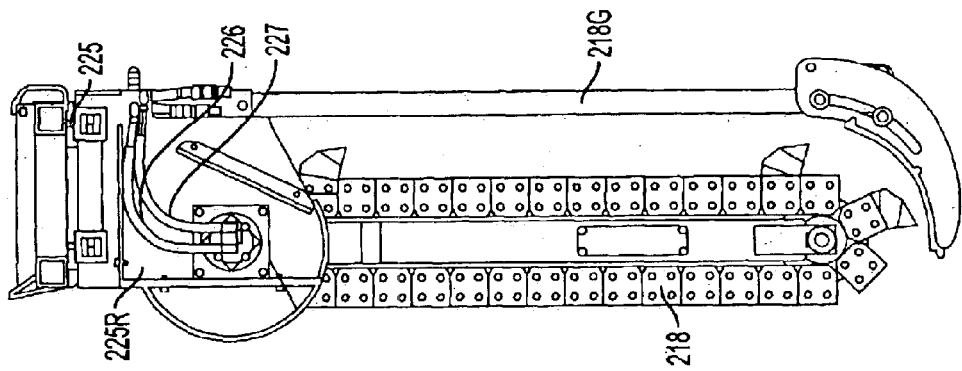
FIG. 3(C) is a right side view of portions of the utility mechanism shown in FIG. 3(A)
Figure 3B:
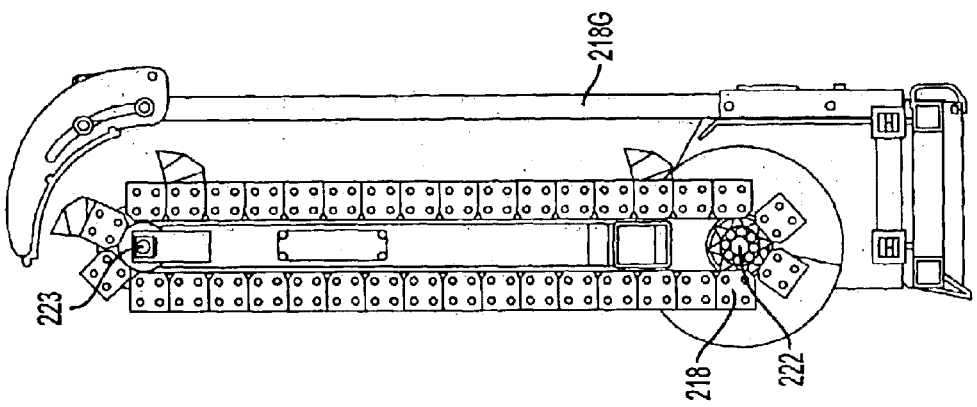
FIG. 3(B) is a left side view of portions of the utility mechanism shown in FIG. 3(A)
Figure 3A:
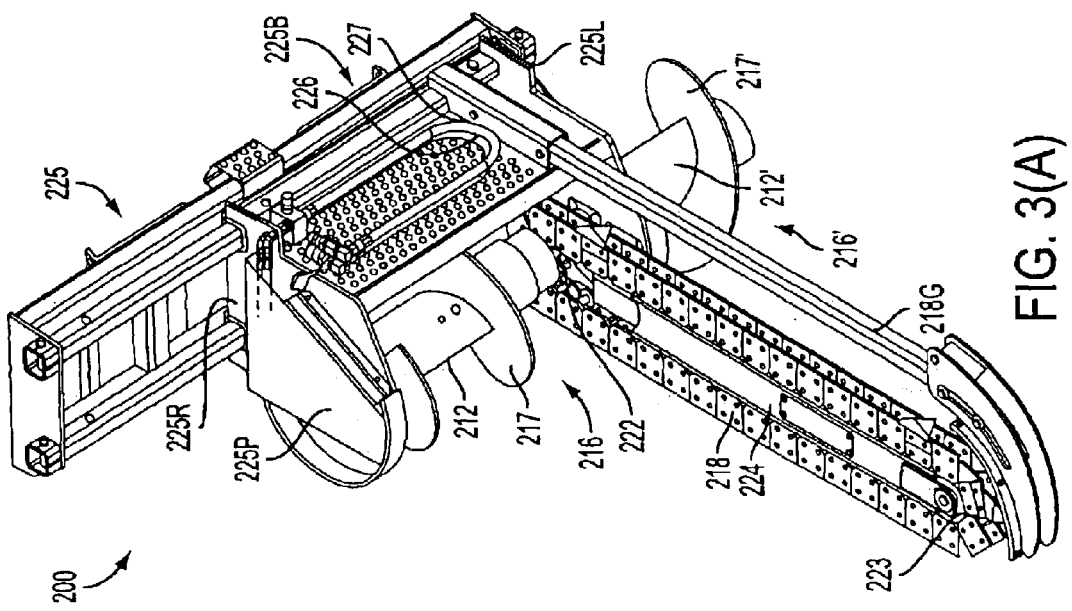
FIG. 3(A) is a top perspective view of a trencher utility mechanism according to some illustrative embodiments.

Preferred Utility Mechanism Drive Structures:

FIGS. 3(A)–3(D) show an illustrative embodiment having, in this example, a trencher tool utility mechanism 230. In this example, the trencher tool 230 includes a rotatable drive drum 210 (best shown in FIG. 3(D)). In the preferred embodiment, as shown, the drive drum 210 is located inside an auger 216 (best shown in FIG. 3(A)). As shown in FIG. 3(A), the auger 216 preferably includes a drum 212 and a helical blade 217 around the drum 212. In some preferred embodiments, the drum 210 and the drum 212 can be the same or can be integrally formed. In preferred embodiments, the auger 216 operates as a spoils auger that drives soil laterally away from, in the illustrated example, a trencher chain 218 or the like.

Preferably, the drum 212 is situated in a generally horizontal orientation and is substantially perpendicular to a plane in which the trencher chain rotates. Preferably, a drive motor 214 is located inside the drum 210. In the preferred embodiments, the drive motor 214 is a hydraulic motor. In some embodiments, the hydraulic motor can be powered via a hydraulic source on a vehicle. For instance, the system can be incorporated in common skid steer vehicles or other vehicles, having, for example, auxiliary hydraulic flows of more than about 15 gallons per minute, or, in other embodiments, more than about 30 gallons per minute, or, in other embodiments, more than about 45 gallons per minute.

Figure 3D:
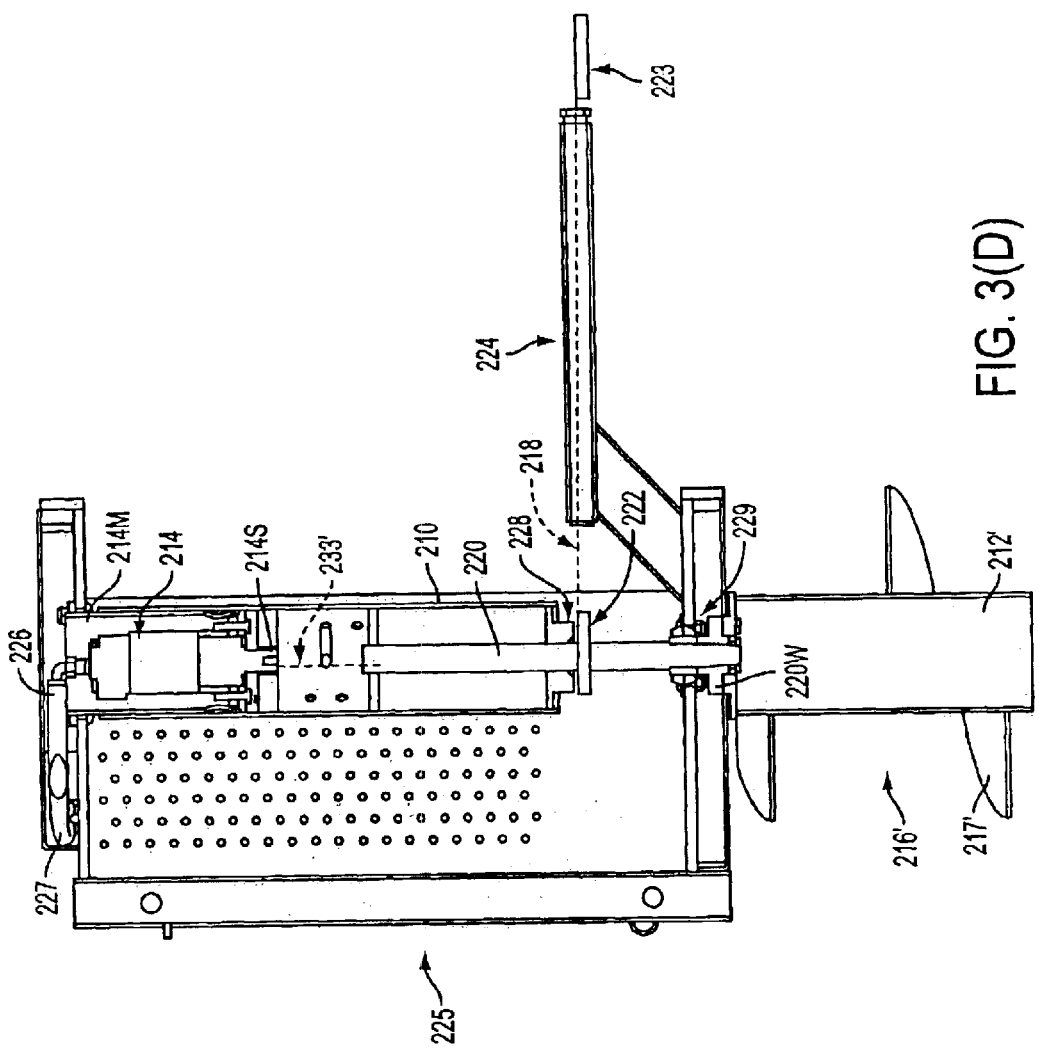
FIG. 3(D) is a top cross-sectional view of portions of the utility mechanism shown in FIG. 3(A)

In the preferred embodiments, the drive motor 214 is also coupled to effect movement of a second mechanism (such as, e.g., the trencher chain in this illustrative embodiment). In some preferred embodiments, the trencher chain 218 is operatively connected to a drive shaft 220 extending from the hydraulic motor 214. As shown in FIGS. 3(A), 3(B) and 3(D), a trencher chain drive sprocket 222 can be fixed directly to the drive shaft 220 or can be fixed indirectly thereto. The drive sprocket 222 can include teeth that mesh with links in a chain 218 to effect rotational movement thereof. As shown in FIGS. 3(A)–3(C), the trencher chain 218 can be supported at its distal end via another sprocket 223 that can be mounted, for example, to a support arm 224. The support arm 224 is preferably fixed to a support frame 225 that supports the device. For example, the frame 225 can include, e.g., left and right side members 225L and 225R, respectively, and a base 225B having a plurality of support bars 225S upon which the side members 225L and 225R are mounted. In some embodiments, the side members 225L and 225R can be selectively positioned along the bars 225S to laterally reposition the unit as desired. In some illustrative embodiments, the base 225B can be attached to a utility vehicle, such as, e.g., to a mount 140M on a utility boom as shown in FIG. 1. In that regard, any appropriate attachment mechanism can be used, such as, e.g., attachment clamps, bolts or the like. As shown in FIGS. 3(A)–3(C), a chain guard 218G can also be provided which extends from the frame 225 to the front end of the chain 218.

As shown in FIGS. 3(A), 3(C) and 3(D), in embodiments using a hydraulic motor 214, hydraulic lines 226, 227 can be used to direct hydraulic fluid to and/or from the hydraulic motor 214. In some preferred embodiments, the hydraulic lines 226, 227 extend to and from a fluid source, such as, for example, located upon a utility vehicle 100. The hydraulic lines 226, 227 preferably enter the cylinder 210 from an end thereof and connect to the hydraulic motor 214 as shown in FIGS. 3(C)–3(D). Preferably, the hydraulic lines 226, 227 are supported within a protective chamber 225P supported on a side of the frame, such as, e.g., on the side 225R in the illustrated embodiment. In preferred embodiments, the protective chamber 225P has a width sized to accommodate the hydraulic lines without substantial additional space therearound. For example, the width of the protective chamber can be, e.g., about less than 5 times a diameter of the lines 226, 227, or, more preferably, less than about 3 times a diameter of the lines 226, 227. Preferably, the width of the protective chamber is about a few inches or less, such as, e.g., less than about 6 inches, or, more preferably, less than about 2 or 3 inches. In this manner, in the most preferred embodiments, an outside wall of the protective chamber 225P is preferably only about a few inches from an end of the drum 210, or, more preferably, less than about 6 inches away, or, more preferably, less than about 3 inches away, or, more preferably, less than about 2 inches away from an end of the drum 210.

In the preferred embodiments, there is no or substantially no need for a chain drive, a sealed oil bath transmission case and/or the like for driving the drive chain 218. Among other things, these and/or other advantages can, e.g., help reduce costs, enhance machine performance and/or facilitate maintenance of the device. In the preferred embodiments, the overall unit width can be minimized. For example, the a) internal motor structure and b) the utility connections (e.g., connection to the trencher chain) can enable a substantial reduction in width. In some embodiments, a device will only need additional width beyond a drum sufficient to enable hydraulic connections on an end of the drum. Among other things, the preferred embodiments can avoid the need for a) a transmission case and/or b) a hydraulic motor protruding out of a side of the unit.

As shown in FIG. 3(D), the motor 214 is preferably fixedly mounted upon a support mount cylinder 214M that is fixedly attached to the frame 225. The motor 214 preferably drives a rotatable output drive shaft 214S. The drive shaft 214S is preferably connected to rotate the drum 210. Preferably, this connection is a direct-drive connection. The drum 210 is preferably mounted so as to rotate around the motor 214 and motor mount 214M (such as, e.g., using bearings around the mount 214M in some illustrative embodiments). In some embodiments, the shaft 214S can be connected directly to the drum. In some embodiments, the shaft 214S can be connected to the drum via one or more gears. In some embodiments, the shaft 214S can be connected to the drum via a clutch mechanism, a transmission mechanism and/or via another drive mechanism that may control drum rotation based on rotation of the shaft 214S. In some embodiments, a shaft 220 can be driven by the shaft 214S, either directly or via a drive mechanism. In some embodiments, the shaft 220 can be integral within, or even the same as, the shaft 214S. As shown in the illustrated embodiment, the shaft 220 can extend from the drum 210 through a support bearing 228 or the like. In this manner, rotation of the shaft 214S can impart rotation to the sprocket 222 and, hence, rotation of a trencher chain mechanism or the like.

In some preferred embodiments, as shown in FIG. 3(D), the shaft 220 is rotatably supported upon the frame 225, such as, for example, via a bearing 229. In the embodiment shown, a second auger element 226 is provided on an opposite side of the trencher chain 218. In some preferred embodiments, the auger element 216 is fixedly connected to the shaft 220 so as to rotate therewith. For example, as shown, the end of the shaft 220 can be fixed to a washer 220W (such as, e.g., via a keyway, bolts and/or the like), and the washer 220W can, in turn, be fixed to the drum 212' of the auger 216' (such as, e.g., via bolts or the like). Preferably, the auger blades 217 and 217' are oppositely threaded around the respective drums so as to cause soil (i.e., soil is used herein to refer to ground elements, such as, e.g., dirt, mud, clay, sand, gravel, rocks, natural or man-made debris, vegetation, leaves, twigs, branches and/or various other ground materials) to be moved laterally away from the trencher chain from both sides of the chain (e.g., while the drums 210 and 210' are caused, in preferred embodiments, to rotate in a like direction). Preferably, as shown, the two augers 216, 216' can be placed on opposite sides of a utility device, such as, e.g., a trencher chain, without using substantial additional parts, such as, e.g., a second shaft, sprocket and bearing. In this manner, in some embodiments, the ground soil or the like can be moved very efficiently away from the trencher chain or the like, thereby enabling a cleaner trench and/or the like.

Planetary Gear Embodiments:

FIGS. 4(A)–4(B) show some embodiments in which, by way of example, a device such as, e.g., that shown in FIGS. 3(A)–3(D) can be modified to include a hydraulic motor 214 positioned within a drive drum 210 and with the motor connected to a planetary transmission 232 that is also positioned within the drum drive 210. In some embodiments, the spoils auger 216 can be adjusted laterally to accommodate different chain 218 widths, such as, e.g., for chains having a width of between about 4 inches to 12 inches. For example, holes 210H can facilitate such adjustment in some embodiments. In some preferred embodiments, the planetary transmission 232 includes at least one planetary gear set 233 (such as, e.g., similar to that shown outside of drum in dashed lines in some illustrative embodiments). In some preferred embodiments, a planetary gear set 233 can be used to provide additional torque without adding to the overall size of the unit. For example, a planetary gear set can be used to convert a higher revolution-per-minute (RPM) rotation to a lower RPM rotation and a higher torque in some embodiments. In some illustrative embodiments, the planetary gear set can include, e.g., one or more sun gear (such as, e.g., a gear at the end of the drive shaft 214S), one or more planet gear 233P that can mesh with the sun gear, and one or more ring gear 233R that can mesh with certain planet gears. In some embodiments, a planetary gear set can be used to provide a desired gear ratio depending on circumstances (such as, e.g., in some embodiments about 4:1, 5:1, 16:1, 20:1, 25:1, 80:1, 100:1 and/or another ratios as desired).

In some embodiments, an output of the planetary transmission can be used to drive the drum 210, such as, e.g., via a drive disk 234. For example, the disk 234 could be fixedly connected to the ring gear(s) 233 via a drive member 233D in just some illustrative embodiments such as shown in FIG. 4(A). The drive disk 234 can then, in turn, be fixedly connected to the drum 210 to rotate the same.

In some embodiments, an output of the planetary transmission can be used to drive the shaft 220 and, hence, to drive a trencher chain or the like. In some embodiments, a drive disk could be fixedly connected to both the drum 210 and the shaft 220 to cause such to rotate together via the planetary transmission.

In some embodiments, an output of the planetary transmission can be used to drive the shaft 220 alone. For example, the shaft 220 could be rotatably received within the disk 234 (e.g., via a bearing connection, for example) and could be fixedly connected to the ring gear(s) 233 via a drive member 233D. In this case, the drive shaft 214S can be, e.g., directly connected to drive the drum, such as via another drive disk fixedly connected to the drum 210 and the drive shaft 214S.

In some embodiments, the gear ratio of the planetary transmission can be non-variable. For example, the planetary transmission can include a single ring gear that meshes with a single set of planetary gears. In other embodiments, the gear ratio of the planetary transmission can be variable. As merely one example, in some embodiments, a plurality of sets of ring gears and respective planet gears having different sizes and gear ratios can be brought into and out of engagement with a gear on the drive shaft. For example, in some embodiments, the drive shaft gear can potentially be movable along an axis A shown in FIG. 4(B)(such as, e.g., via a telescoping drive shaft 214S or the like).

Alternative Embodiments:

In various alternative embodiments, principles herein can be employed within various other power tool utility mechanisms having drive drums and/or tool support tubes. Preferably, in these additional embodiments, a planetary gear set is also employed. A variety of illustrative alternative embodiments employing some principles herein are described below.

In the preferred alternative embodiments, the device is advantageously configured to address high torque requirements. For example, the preferred embodiments include an internal planetary get set or transmission, such as, e.g., described above. Among other things, this can provide increased advantages in a high-torque environment. Second, in preferred embodiments, the drive connection between an output of the drive shaft of the hydraulic motor and the drum is displaced inwards from an end of the drum. As a result, the longest distance to an end of the drum from the drive connection is substantially reduced and, hence, torsion can be reduced on the drum and related structure. In some preferred embodiments, the drive connection is at least about 10% of the distance across the drum, or, in some embodiments, at least about 15% of that distance, or, in some embodiments, at least about 25% of that distance, or, in some embodiments, at least about 35% of that distance.

Figure 5A:
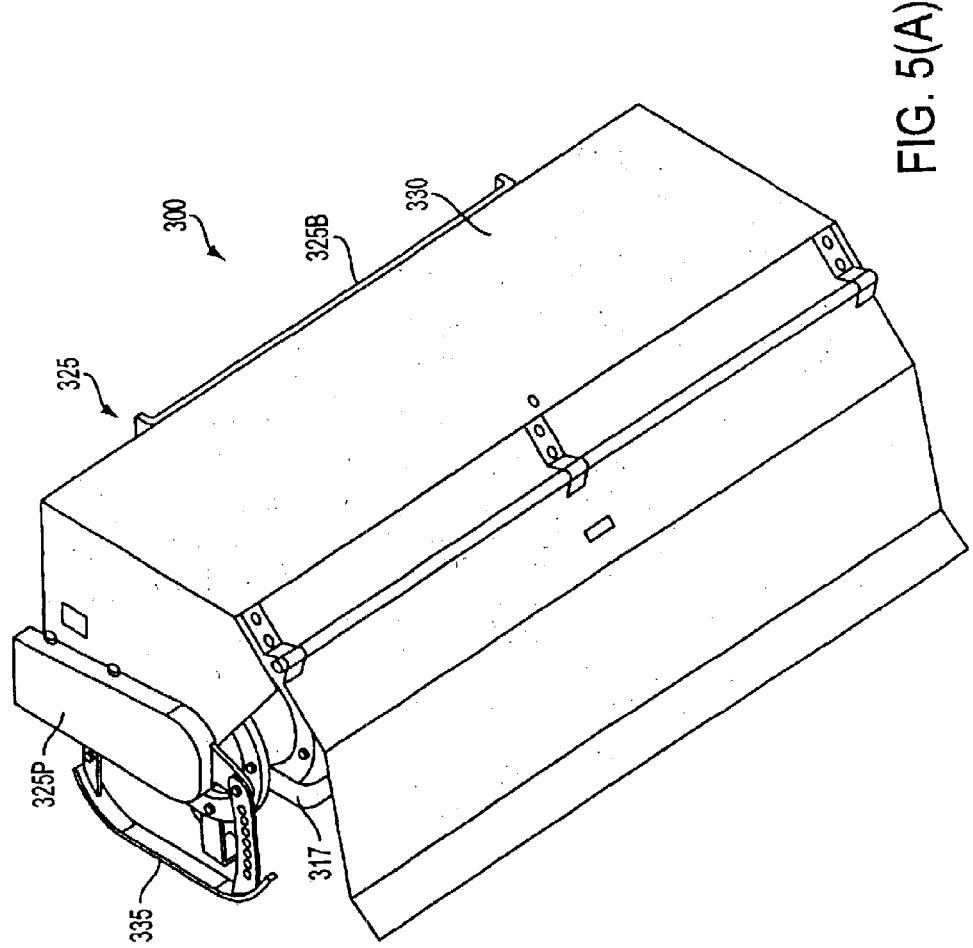
FIG. 5(A) is an elevational top view of a tiller assembly according to some embodiments of the invention.
Figure 5C:
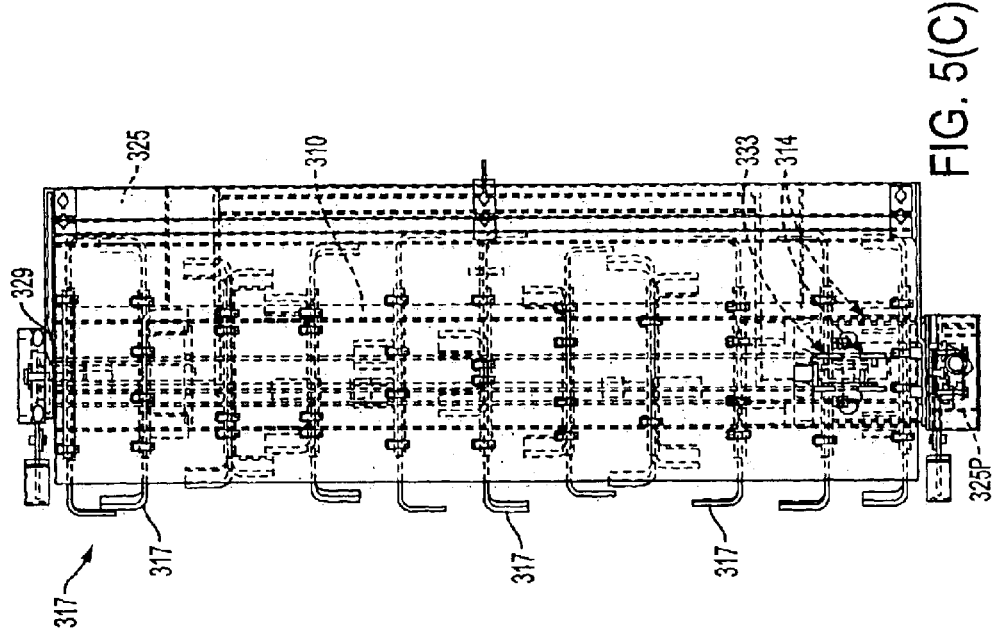
FIG. 5(C) is a top view of the assembly shown in FIG. 5(A) with internal components depicted in dashed lines.
Figure 5B:
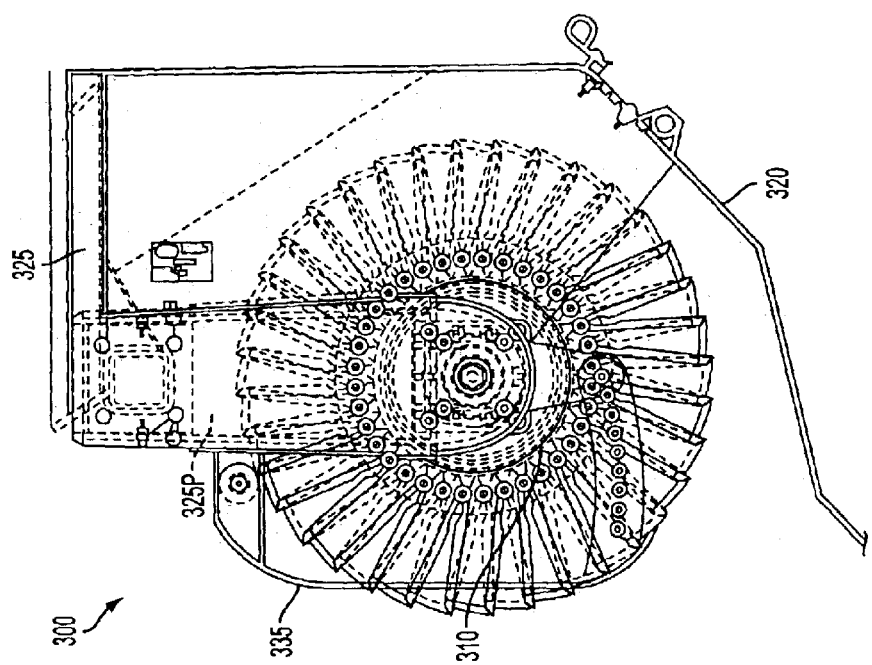
FIG. 5(B) is a cross-sectional right side view of the assembly shown in FIG. 5(A)

FIGS. 5(A)–5(C) show, for example, an embodiment having, e.g., a tiller assembly 300. As shown in FIGS. 5(A)–5(B), the device can include a support frame 325 that can be, for example, fixed to a vehicle, such as via an attachment base plate 325B. In one illustrative example, the base plate 325B could be attached to the member 140M in the embodiment shown in FIG. 1. In some embodiments, the tiller can be used, for example, to dig into and/or mix soil on and/or under the ground, to improve seed beds, to loosen compacted ground soil on construction sites and/or the like, to prepare landscaping soil and/or various other tiller applications. As shown in FIG. 5(C), the tiller assembly can include, e.g., a drive drum 310 with an internal hydraulic motor 314. In some illustrative embodiments, the tiller assembly can include a plurality of tines 317 extending outward from the drum 310. Preferably, the tines 317 are arranged in a staggered relationship around the periphery of the drum, such as, e.g., like that shown in FIG. 5(C). In some illustrative embodiments, the tines are formed from generally L-shaped plates and are configured substantially as shown in FIG. 5(C). In some embodiments, the tines are large. For instance, in some embodiments, the tines 317 can extend outward from the drum 310 at least about 3 inches, or, in other embodiments, at least about 4 inches, or, in other embodiments, at least about 6 inches or more. In some preferred embodiments, the system allows for bidirectional rotation of the tines via the drum. For example, in some embodiments, the motor drive shaft 214S can be rotated in clockwise and counter-clockwise directions.

In some embodiments, such as shown in FIG. 5(A), the tiller assembly can include a cover guard 320. In addition, as shown in FIG. 5(A), the tiller assembly can also include guide-rails 335 (such as, e.g., at left and right sides of the device) that slide along the ground during operation. Other embodiments could include wheels or other means for supporting the unit with respect to a ground surface level.

In the preferred embodiments, as shown in FIG. 5(C), the tiller assembly includes a hydraulic motor contained inside the drum 310. As discussed above, this can provide a variety of benefits. In some preferred embodiments, hydraulic lines can extend to the motor from an end of the drum. In some preferred embodiments, the hydraulic lines are contained in a protective chamber 325P. Preferably, the outside wall of the protective chamber 325P is close to the edge of the drum, such as, e.g., similar to that described above.

As discussed above, the device is preferably advantageously configured to address high torque requirements. In some instances, the large tines contribute to the creation of a high torque upon the tiller assembly. Moreover, in the preferred embodiments, the tiller assembly includes an internal planetary get set or transmission, such as, e.g., described above. Among other things, this can provide increased advantages in a high-torque environment. Moreover, in preferred embodiments, the drive connection between an output of the drive shaft of the hydraulic motor and the drum is displaced inwards from an end of the drum. As a result, the longest distance to an end of the drum from the drive connection is substantially reduced and, hence, torsion can be reduced on the drum and related structure.

As shown in FIG. 5(C), the drum 310 is preferably rotatably supported at one side of the support frame 325 via a bearing 329 and is preferably rotatably supported at the other side of the support frame so as to rotate about a motor mount such as described above (such as, e.g., using bearings between a motor mount and the drum). As shown, in preferred embodiments, a planetary gear transmission 333 (shown in dashed lines), which can be, e.g., like that in any of the embodiments disclosed herein, can be employed.

Figure 6A:
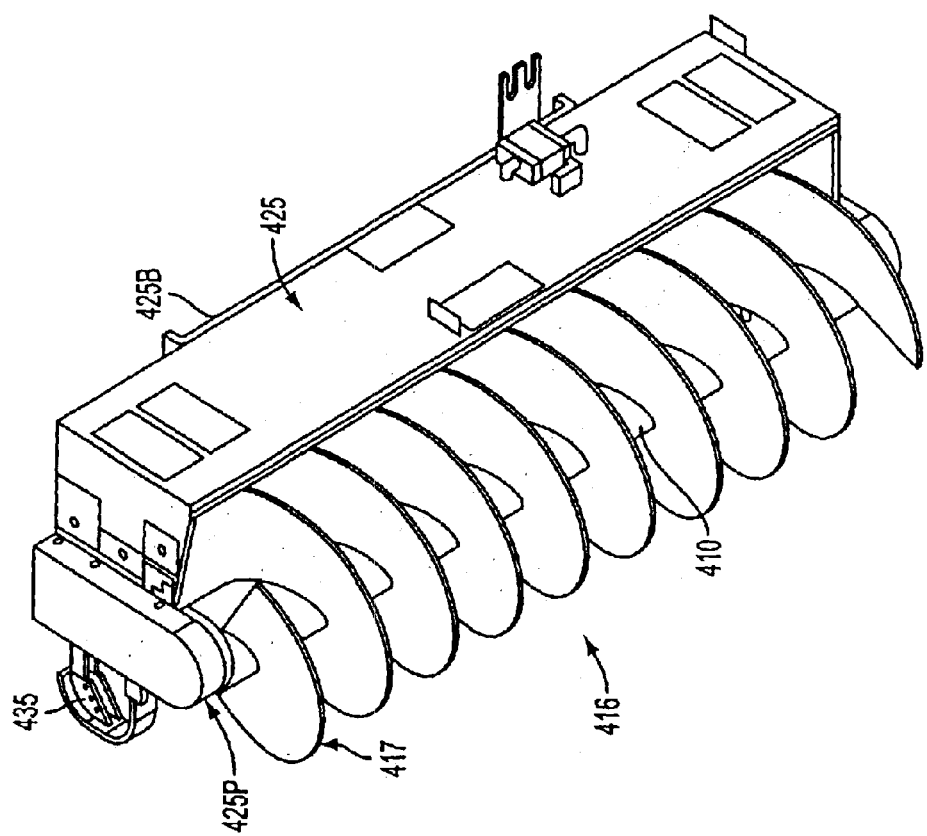
FIG. 6(A) is an elevational top view of an auger assembly according to some embodiments of the invention.

FIGS. 6(A)–6(C) show, as another example, an embodiment involving a backfill auger assembly 410 having a drive drum 410 with an internal hydraulic motor 414. As shown in FIG. 6(A), the device can include a support frame 425 that can be, for example, fixed to a vehicle, such as via the attachment base plate 425B. For instance, as one example, the base plate 425B could be attached to the member 140M in the embodiment shown in FIG. 1. In addition, as shown in FIGS. 6(A) and 6(C), the backfill auger assembly can also include guide-rails 435 (such as, e.g., at left and right sides of the device) that slide along the ground during operation. In some preferred embodiments, the hydraulic lines are contained in a protective chamber 425P. Preferably, the outside wall of the protective chamber 425P is close to the edge of the drum, such as, e.g., similar to that described above, in some embodiments.

As shown in FIG. 6(B), the drum 410 is preferably rotatably supported at one side of the support frame 425 via a bearing 429 and is preferably rotatably supported at the other side of the support frame so as to rotate about a motor mount 414 (such as, e.g., using bearings between the motor mount 414 and the drum). As shown, in preferred embodiments, a planetary gear transmission 433, such as, e.g., any of the embodiments disclosed herein, can be employed.

Figure 7A:
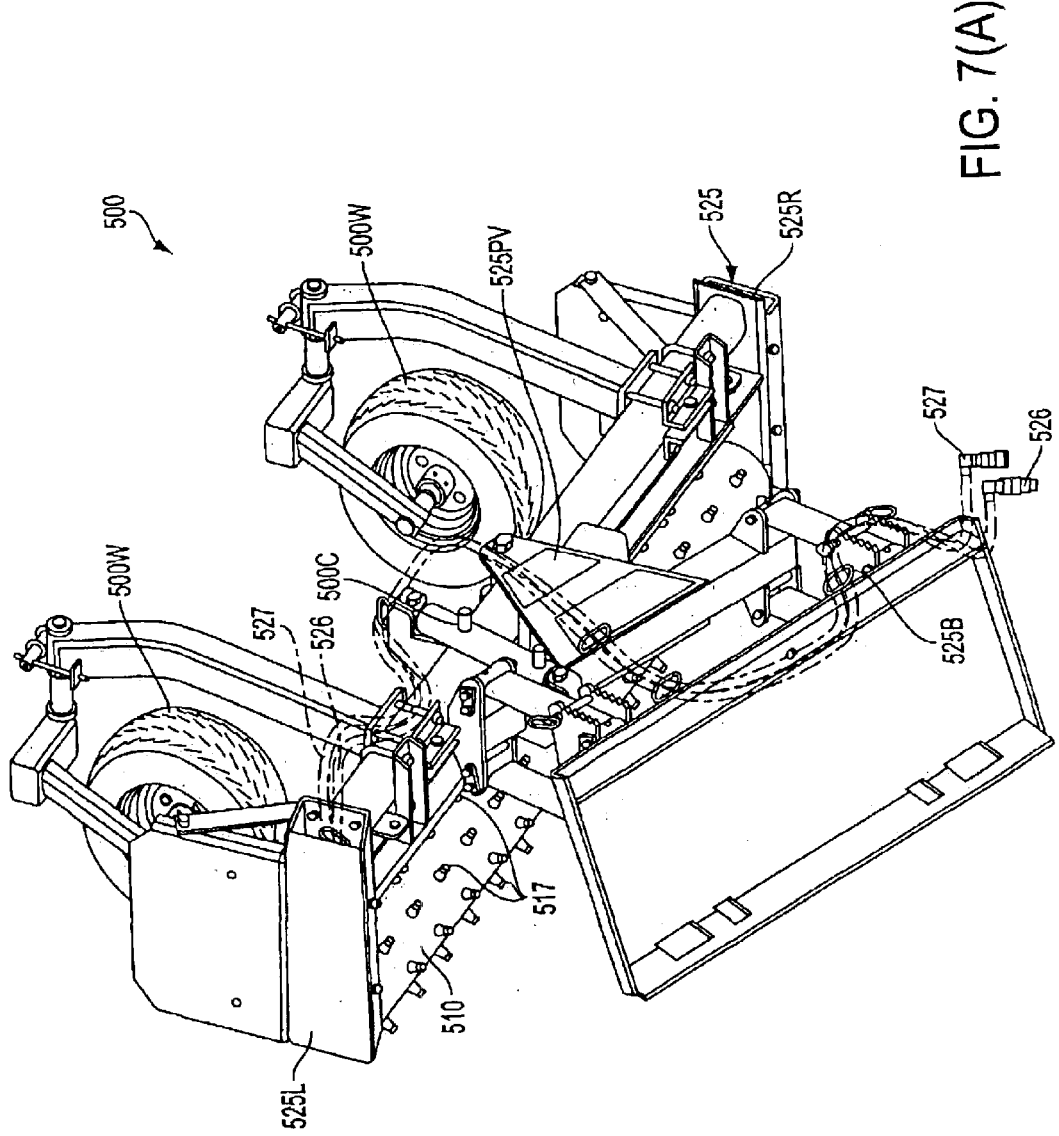
FIG. 7(A) is an elevational top view of a rake assembly according to some embodiments of the invention.
Figure 8A:
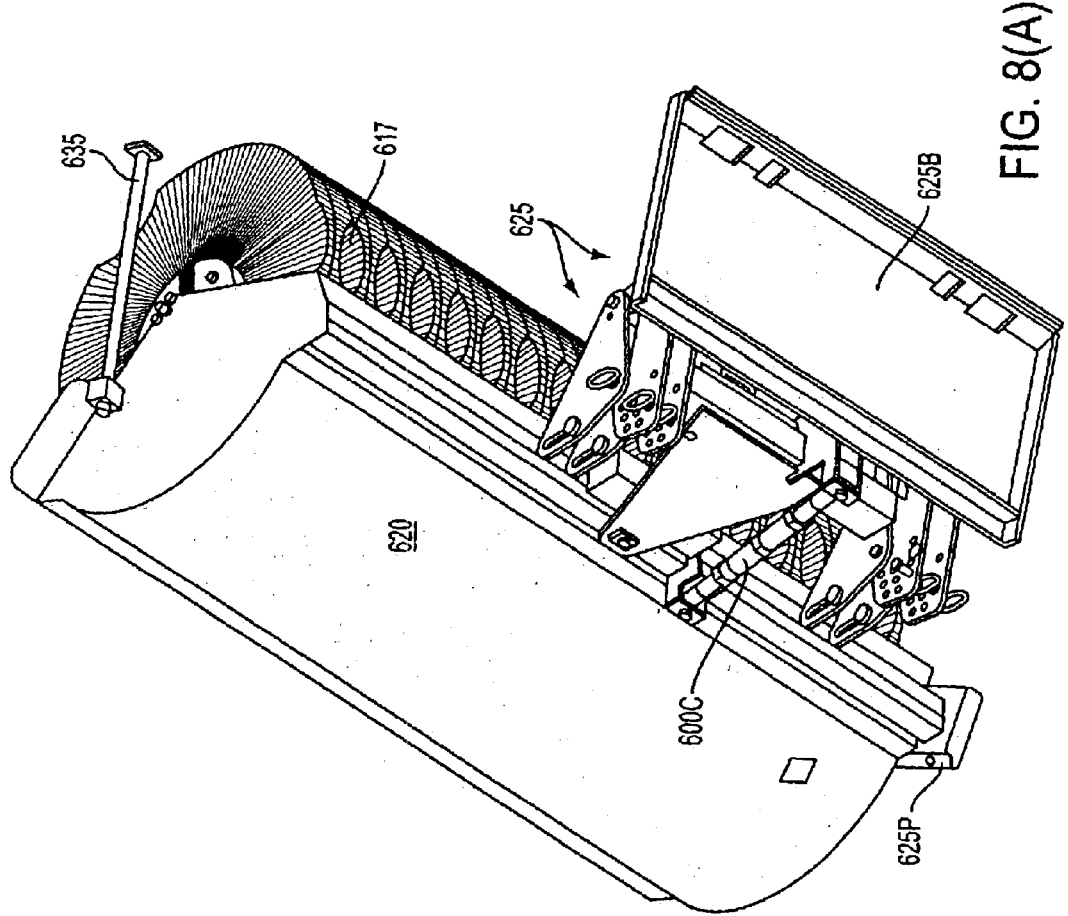
FIG. 8(A) is an elevational top view of a broom assembly according to some embodiments of the invention.

FIGS. 7(A)–7(C) show, as another example, an embodiment involving a rower rake 500 with a drive drum 510 having an internal hydraulic motor 514. As shown in FIGS. 7(A)–7(B), the device can include a support frame 525 that can be, for example, fixed to a vehicle, such as via the attachment base plate 525B. For instance, as one example, the base plate 525B could be attached to the member 140M in the embodiment shown in FIG. 1. In some embodiments, the power rake can have a variety of uses from breaking up and/or leveling rough soil to de-thatching existing sod and/or creating beds for landscaping. In some preferred embodiments, it includes a powerful internally mounted direct-drive motor 514, metal or the like (such as, e.g., carbide-tipped) teeth 517 and/or parallel linkage to follow ground contours. In some embodiments, the parallel linkage can be locked into a fixed position if desired. Preferably, front caster wheels 500W are provided having a vertical height adjustment so as to provide depth control. In some illustrative embodiments, the drum has about a 6-foot working width. Preferably, the device includes an angle adjustment feature that enables the drum 510 to be set at a desired angle θ, such as, e.g., shown in FIG. 7(B), whereby it can, for example, be used for windrowing rocks and/or debris. In some embodiments, it can include a hydraulic angle adjustment that is effected via a hydraulic cylinder 500C. In that regard, front and rear sections of the frame 525 are preferably connected so that the front section of the frame pivots with respect to the rear section via a pivot support bracket 525PV.

With reference to FIG. 7(B), a drum 510 is preferably rotatably supported at one side of the support frame 525 via a bearing and is preferably rotatably supported at the other side of the support frame so as to rotate about a motor mount similar to embodiments described above (such as, e.g., using bearings between a motor mount and the drum). As shown, in preferred embodiments, a planetary gear transmission 533 (shown in dashed lines), such as, e.g., like that of any of the embodiments disclosed herein, can be employed.

In some preferred embodiments, the hydraulic lines 526 and/or 527 leading from the hydraulic source are protected within a protective chamber 525P. Preferably, the outside wall of the protective chamber 525P is close to the edge of the drum, such as, e.g., similar to that described above, in some embodiments.

FIGS. 8(A)–8(D) show, as another example, an embodiment involving a broom assembly 610 with a drive drum 610 having an internal hydraulic motor 614. As shown, the device can include a support frame 625 that can be, for example, fixed to a vehicle, such as via the attachment base plate 625B. For instance, as one example, the base plate 625B could be attached to the member 140M in the embodiment shown in FIG. 1. In some embodiments, the broom assembly can include a plurality of bristles 617 around the periphery of the drum. Preferably, the device includes an angle adjustment feature that enables the drum 610 to be set at a desired angle θ. In some embodiments, the adjustment can be effected via a hydraulic cylinder 600C and the front and rear sections of the frame 625 can be connected such that the front section of the frame pivots with respect to the rear section via a pivot support bracket 625PV.

With reference to FIG. 8(C), a drive drum 610 is preferably rotatably supported at one side of the support frame 625, such as, e.g., at right side 625R, via a bearing 629 and is preferably rotatably supported at the other side of the support frame so as to rotate about a motor mount similar to embodiments described above (such as, e.g., using bearings between a motor mount 614M and the drum). As shown, in preferred embodiments, a planetary gear transmission 633 (shown in dashed lines), such as, e.g., like that in any of the embodiments disclosed herein, can be employed.

In some preferred embodiments, the hydraulic lines 626 and/or 627 leading from the hydraulic source are contained in a protective chamber 625P. Preferably, the outside wall of the protective chamber 625P is close to the edge of the drum, such as, e.g., similar to that described above.

In preferred implementations of the embodiments shown in FIGS. 5(A)–8(D), a variety of advantages can be achieved, such as, for example: a) the width of a given unit can be considerably reduced (e.g., the tools can be driven without a bulky chain transmission or the like); b) a smaller hydraulic motor that can be operated at higher pressures can be utilized (e.g., some hydraulic systems have higher pressure and higher flows than can be handled by some large displacement hydraulic motors); c) enhanced torsion-related properties can be achieved (such as, e.g., i) increasing torque applied to a utility mechanism through a planetary transmission and/or ii) decreasing torsion on a drum or the like by locating a drive connection more centrally inside the drum); and/or d) various other advantages as would be appreciated based on this disclosure.

Broad Scope of the Invention:

While illustrative embodiments of the invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In some illustrative and non-limiting embodiments, some or all elements can be formed substantially proportional and to scale as that shown in the accompanying figures, but, in various embodiments, the structure of the various embodiments can vary widely based on circumstances.

What is claimed is:

1. A soil-engaging utility device having a utility mechanism with a motor-driven utility drum, comprising:
   a) a support to support said device on a vehicle;
   b) a utility mechanism including a rotatable drum, said drum including at least one soil-engaging member on a periphery of the drum, said drum being positionable generally horizontally and generally transverse to said vehicle;
   c) a motor contained substantially entirely inside said drum, said motor having a drive shaft extending inwards into said drum;
   d) planetary gear set inside said drum and operatively connected to said drive shaft to increase torque between said drive shaft and said drum, said planetary gear set converting a higher revolution-per-minute rotation to a lower revolution-per-minute rotation; and
   e) an output of said planetary gear set being operatively connected to said drum at a connection location that is displaced inward from ends of said drum to reduce torsion on said drum.

2. The soil-engaging utility device of claim 1, wherein said connection location is positioned at least about 15% inward within the drum.

3. The soil-engaging utility device having a utility mechanism with a motor-driven utility drum of claim 2, wherein said connection location is positioned at least about 15% inward from each of two opposite ends of the drum.

4. The soil-engaging utility device of claim 1, wherein said connection location is positioned at least about 25% inward within the drum.

5. The soil-engaging utility device having a utility mechanism with a motor-driven utility drum of claim 4, wherein said connection location is positioned at least about 25% inward from each of two opposite ends of the drum.

6. The soil-engaging utility device of claim 1, wherein said utility mechanism extends outward from an end of said drum proximate said motor a distance substantially only to accommodate power lines leading to said motor.

7. The soil-engaging utility device of claim 6, further including a protective enclosure for said power lines, an outer wall of said enclosure being spaced less than about 6 inches from said end of said drum.

8. The soil-engaging utility device of claim 6, further including a protective endosure for said power lines, an outer wall of said enclosure being spaced less than about 3 inches from said end of said drum.

9. The soil-engaging utility device of claim 1, wherein said power lines include hydraulic lines and said motor is a hydraulic motor.

10. The soil-engaging utility device of claim 1, wherein said power lines include electric lines and said motor is an electric motor.

11. The soil-engaging utility device of claim 1, wherein said motor is a hydraulic motor.

12. The soil-engaging utility device of claim 1, wherein said at least one soil-engaging member is a helical auger blade.

13. The soil-engaging utility device of claim 1, wherein said at least one soil-engaging member engages a ground surface during operation.

14. The soil-engaging utility device of claim 1, wherein said at least one soil-engaging member engages soil driven upward from said ground surface during operation.

15. The soil-engaging utility device of claim 1, wherein said at least one soil-engaging member includes a plurality of ground-engaging tines.

16. The soil-engaging utility device of claim 1, wherein said at least one soil-engaging member includes at least one member from the group consisting of an auger member, a tiller member, a rake member and a broom member.

17. The soil-engaging utility device of claim 1, further including a utility vehicle upon which said utility mechanism is supported.

18. A method for enhancing torsion properties of a soil utility mechanism having a motor-driven utility drum, comprising:
 a) providing a soil utility mechanism including a rotatable drum, said drum including at least one soil-engagement member extending therefrom around a periphery of the drum, said drum being positionable generally horizontally and generally transverse to said vehicle, and a motor contained substantially entirely inside said drum, said motor having a drive shaft extending inwards into said drum;
 b) increasing torque from said drive shaft via a planetary transmission located inside of said drum;
 c) reducing torsion on said drum by operatively connecting an output of said planetary gear transmission to said drum at a location that is displaced substantially inward from opposite ends of said drum to reduce torsion on said drum; and
 d) engaging soil with said soil-engagement members so as to create torque on said drum.

19. The method of claim 18, wherein said reducing torsion on said drum includes positioning said location at least about 15% inward from each of two opposite ends of the drum.

20. The method of claim 18, wherein said reducing torsion on said drum includes positioning said location at least about 25% inward from each of two opposite ends of the drum.

21. A soil-engaging utility device having a utility mechanism with a motor-driven utility drum, comprising:
 a) a support to support said device on a vehicle;
 b) said utility mechanism including a rotatable drum, said drum including at least one soil-engaging member extending around a periphery of the drum, said drum being positionable generally horizontally and generally transverse to said vehicle;
 c) a motor contained substantially entirely inside said drum, said motor having a drive shaft extending inwards into said drum;
 d) said drive shaft being operatively connected to said drum at a connection location that is displaced inward from ends of said drum to reduce torsion on said drum;
 e) said drive shaft also being operatively connected to a second utility mechanism so as to effect movement of said second utility mechanism.

22. The soil-engaging utility device of claim 21, wherein said second utility mechanism includes a rotatable soil-engaging member.

23. The soil-engaging utility device of claim 22, wherein said rotatable soil-engaging member is a trencher chain that is positionable below a ground surface level.

24. The soil-engaging utility device of claim 22, wherein said rotatable soil-engaging member is driven at a different rate of rotation than said drum.

25. The soil-engaging utility device of claim 22, further including a planetary gear transmission inside of said drum and operatively connected to a drive shaft of said soil-engaging member, said planetary gear set converting a higher revolution-per-minute rotation to a lower revolution-per-minute rotation.

26. The soil-engaging utility device of claim 21, wherein said drive shaft directly drives both said second utility mechanism and said drum.

27. The soil-engaging utility device of claim 21, further including a planetary gear transmission inside of said drum and operatively connected to said drive shaft to increase torque between said drive shaft and said drum, said planetary gear set converting a higher revolution-per-minute rotation to a lower revolution-per-minute drum rotation; and an output of said planetary gear transmission being operatively connected to said drum at a connection location that is displaced substantially inward from opposite ends of said drum to reduce torsion on said drum.

28. The soil-engaging utility device of claim 21, further including a utility vehicle upon which said utility mechanism is supported.

29. The soil-engaging utility device having a utility mechanism with a motor-driven utility drum of claim 21, wherein said location is at least about 15% inward from each of two opposite ends of the drum.

30. The soil-engaging utility device having a utility mechanism with a motor-driven utility drum of claim 21, wherein said location is at least about 25% inward from each of two opposite ends of the drum.

* * * * *